United States Patent
Charugundla (10) Patent No.: US 9,843,677 B2
(45) Date of Patent: Dec. 12, 2017

(54) DATA ENTRY CONFIRMATION SYSTEM FOR A DEVICE OR SYSTEM WITH DIALING CAPABILITY

(71) Applicant: Kent Srikanth Charugundla, New York, NY (US)

(72) Inventor: Kent Srikanth Charugundla, New York, NY (US)

(73) Assignee: C21 Patents, LLC, New York, NY (US)

( * ) Notice: Subject to any disclaimer, the term of this patent is extended or adjusted under 35 U.S.C. 154(b) by 0 days.

(21) Appl. No.: 14/955,924

(22) Filed: Dec. 1, 2015

(65) Prior Publication Data

US 2016/0105555 A1 Apr. 14, 2016

Related U.S. Application Data

(63) Continuation of application No. 14/492,627, filed on Sep. 22, 2014, now abandoned.

(60) Provisional application No. 61/886,583, filed on Oct. 3, 2013.

(51) Int. Cl.
| | |
|---|---|
| *H04M 7/00* | (2006.01) |
| *H04M 1/00* | (2006.01) |
| *H04M 3/00* | (2006.01) |
| *H04M 3/42* | (2006.01) |
| *H04M 3/436* | (2006.01) |
| *H04W 4/16* | (2009.01) |

(52) U.S. Cl.
CPC ....... *H04M 3/4365* (2013.01); *H04M 3/4211* (2013.01); *H04M 3/42042* (2013.01); *H04M 3/42093* (2013.01); *H04W 4/16* (2013.01)

(58) Field of Classification Search
CPC ............ H04M 3/44; H04M 1/274558; H04M 1/274516; H04M 1/72453; H04M 1/72552; H04L 29/06; H04L 67/04; H04L 67/16; H04L 67/18; H04L 67/306; H04W 88/02; G06F 17/30395
USPC ........ 379/93.17, 93.23, 142.06, 142.17, 352, 379/354, 355.02, 355.03, 355.04, 355.09, 379/355.1, 357.04, 201.04, 201.07, 379/201.09, 379
See application file for complete search history.

(56) References Cited

U.S. PATENT DOCUMENTS

| | | | | |
|---|---|---|---|---|
| 5,852,657 | A * | 12/1998 | Malik ................. | H04Q 3/0029 379/142.01 |
| 6,564,264 | B1 * | 5/2003 | Creswell ............... | G06Q 10/10 709/206 |

(Continued)

*Primary Examiner* — Binh Tieu
(74) *Attorney, Agent, or Firm* — Paul J. Sutton; Barry G. Magidoff (57) ABSTRACT

A Data Entry Confirmation System (DECS) is provided whereby a user with a communication device capable of communicating with the DECS is able to perform a pre-dialing operation based on contact information inputted onto the communication device and transmitted by said communication device to the DECS. Thus, the DECS is able to perform a reverse caller ID operation allowing a user to confirm identity of the party the user wishes to call prior to actually calling the party. The DECS uses the input contact information to retrieve corresponding contact information from one or more databases with which it is in communication and transmit said output contact information to the user device.

10 Claims, 4 Drawing Sheets

(56) References Cited

U.S. PATENT DOCUMENTS

| | | | | |
|---|---|---|---|---|
| 6,757,372 B1* | 6/2004 | Dunlap | H04M 1/2477 |
| | | | 379/142.01 |
| 7,096,009 B2* | 8/2006 | Mousseau | H04M 1/725 |
| | | | 379/142.06 |
| 7,551,899 B1* | 6/2009 | Nicolas | H04M 1/274558 |
| | | | 379/355.01 |
| 7,711,744 B1* | 5/2010 | Kashikar | G06F 17/30395 |
| | | | 707/769 |
| 8,019,052 B2* | 9/2011 | Chatterjee | H04M 3/42017 |
| | | | 379/67.1 |
| 8,537,975 B2* | 9/2013 | Chatterjee | H04M 3/42017 |
| | | | 379/67.1 |
| 8,594,288 B2* | 11/2013 | Robbins | H04M 1/274516 |
| | | | 379/142.06 |
| 8,725,209 B2* | 5/2014 | Lim | H04M 1/274516 |
| | | | 455/414.1 |
| 9,025,747 B2* | 5/2015 | Chmara | H04M 1/57 |
| | | | 370/352 |
| 2002/0181681 A1* | 12/2002 | Mani | H04M 3/493 |
| | | | 379/142.03 |
| 2003/0115288 A1* | 6/2003 | Ljubicich | H04L 29/06 |
| | | | 709/219 |
| 2004/0266415 A1* | 12/2004 | Belkin | H04M 3/42042 |
| | | | 455/415 |
| 2005/0129219 A1* | 6/2005 | Williamson | H04M 1/274558 |
| | | | 379/355.04 |
| 2007/0027848 A1* | 2/2007 | Howard | G06F 3/0237 |
| 2008/0045184 A1* | 2/2008 | Randall | H04M 1/576 |
| | | | 455/412.2 |
| 2008/0102819 A1* | 5/2008 | Bengtsson | H04M 1/274516 |
| | | | 455/425 |
| 2008/0134088 A1* | 6/2008 | Tse | G06F 17/30241 |
| | | | 715/810 |
| 2009/0060159 A1* | 3/2009 | Chatterjee | H04M 3/4872 |
| | | | 379/207.02 |
| 2010/0210293 A1* | 8/2010 | Lim | H04M 1/72527 |
| | | | 455/466 |
| 2011/0299665 A1* | 12/2011 | Chatterjee | H04M 3/4872 |
| | | | 379/37 |
| 2014/0198907 A1* | 7/2014 | Hodges | H04M 3/44 |
| | | | 379/216.01 |
| 2014/0220962 A1* | 8/2014 | Lim | H04M 1/274516 |
| | | | 455/419 |
| 2015/0006568 A1* | 1/2015 | Brunn | G06F 17/30864 |
| | | | 707/769 |

* cited by examiner

DATA ENTRY CONFIRMATION SYSTEM FOR A DEVICE OR SYSTEM WITH DIALING CAPABILITY

This application is a continuation of application Ser. No. 14/492,627 filed on Sep. 22, 2014 entitled "Data Entry Confirmation System For A Device Or System With Dialing Capability," which claims the benefit of the filing date of U.S. Provisional Application No. 61/886,583 filed on Oct. 3, 2013, which is incorporated herein by reference in its entirety.

FIELD OF THE DISCLOSURE

The present exemplary embodiments generally relate to a communication system and more particularly to a communication system capable of providing information about a party prior to dialing that party.

BACKGROUND

The feature in telephone communications (either in wireline systems or wireless systems) known as 'caller id' is well known and is available in virtually all major publicly accessible voice communication networks. Such a feature allows a called party to see the telephone number of the calling party allowing the called party to have the option as to whether to answer the call based on the phone number of the calling party. The called party, in essence, either knows who is calling and answers the call or not answer the call. Alternately, the called party does not recognize the telephone number of the person calling and will have to make the same decision. In the case where the called party does not recognize the telephone of the calling party, the called party mostly likely has access to various telephone databases and may attempt to identify the party or organization under which the phone number is listed.

Because of the ubiquitous nature of the caller id feature, a calling party has to take affirmative steps to mask his/her phone number for various privacy related reasons, for example. A calling party may not want others receiving his/her calls to document his/her telephone number. For many mobile devices, for example, a party may have the option to block his/her caller id information thus preventing his/her telephone number from being discerned by the called party. The called party, instead of seeing the phone number of the calling party, will simply see the word 'blocked' on his/her display while the phone is ringing. Arguably, this calling number blocking feature may achieve its intended purpose—preventing the called party from obtaining or detecting the phone number of the calling party—albeit in a very non-subtle manner. The called party may be inclined not to answer the call after noticing that the telephone number of the person calling is being blocked; that is, the called party may be wary of the call because the person making the call is hiding their identity. The assumptions made by the called party and the calling party in not answering a call and in blocking their telephone number may at times inadvertently prevent a telephone conversation from occurring when both parties would actually want to converse with each other.

SUMMARY

A Data Entry Confirmation System (DECS) capable of communicating with one or more subscriber devices is disclosed in which input contact information received from one or more of the subscriber devices are used by the DECS to perform pre-dialing operations to generate output contact information allowing subscriber devices and/or their operators to confirm or validate contact information of a party prior to calling that party. The DECS first prompts a subscriber device to either perform a dialing operation or a pre-dialing operation. Upon receipt of a pre-dialing request, the DECS transmits search input options to the subscriber device for selection. Upon receipt of information from a subscriber device indicating the search input option selected, the DECS searches one or more databases with which it is capable of communicating and retrieves output contact corresponding to the selected search input information. The DECS then transmits a prompt to the subscriber an option to allow the DECS to perform a dialing operation from the retrieved contact information. Thus, the disclosed DECS allows a subscriber to perform a reverse caller ID prior to the subscriber actually calling a party.

BRIEF DESCRIPTION OF THE DRAWINGS

The features and advantages of the exemplary embodiments will become more apparent from the detailed description set forth below when taken in conjunction with the drawings in which like reference numbers indicate identical or functionally similar elements.

DETAILED DESCRIPTION

Various embodiments of a Data Entry Confirmation System (DECS) are described herein. These embodiments are capable of communicating with subscriber devices and/or systems to provide communication services to said subscriber devices. A person or any other entity, who operates such a subscriber device or who owns or controls the operation of such a subscriber device is referred to as a subscriber. Hereinafter, the terms "user" and "subscriber" may be used interchangeably. The DECS may be implemented as a server, a system of interconnected servers, processors or communication devices or any combination thereof capable of communicating with each other to perform at least the steps of receiving input contact information from a subscriber device to generate output contact information (DECS generated contact information), performing the operation of pre-dialing based on the input contact information provided by a user, providing the output contact information for selection by a subscriber device, and performing a user requested dialing operation based on the selected output contact information. The DECS may control or cause other equipment of a communication network to perform the dialing operation. As such, the DECS may be part of a communication network or be capable of communicating with such a network. Hereinafter the terms 'output contact information' and 'DECS generated contact information' are used interchangeably.

The information used by the DECS to perform the pre-dialing operation is received by the DECS from the subscriber device and said information is referred to as user-provided contact information or input contact information. The input contact information—provided by the subscriber device—results from the DECS providing the subscriber device various search input options. One of the provided search input options selected by the subscriber and transmitted by the subscriber device is received by the DECS from the subscriber device (as operated by the subscriber) and is used by the DECS to transmit a command to the subscriber device prompting the device to transmit input contact information (i.e., subscriber device provided contact information) corresponding to the search input option selection received by the DECS. In sum, the search input options are transmitted by the DECS to the subscriber who selects a search input option and transmits the selection to the DECS.

In particular, the DECS may provide to the subscriber device any one of N different types of search input options where N is an integer equal to 1 or greater. For example, one type of search input option may be a name. Another type of search input option may be a telephone number. Yet another type may be a street address. Yet, further another type may be an e-mail address. Upon receiving the search input options from a subscriber device, the DECS prompts the subscriber device to enter particular type of information corresponding to the selected search input option. The information provided by the subscriber device upon receipt of such prompt is referred to as input contact information. Thus, input contact information (i.e., user device provided contact information) is any information associated with a person, or other entity, (i.e., a public or private organization) inputted via a subscriber device by a user and which information can be used by the DECS, when performing a pre-dialing operation, to retrieve output contact information (i.e., DECS generated contact information) from its own database, at least one other database(s), memory locations, servers, communication equipment or any combinations, which are capable of communicating with the DECS. The DECS can also retrieve output contact information from its own database(s) or communication equipment only. The output contact information is any information retrieved by the DECS, which it transmits to the subscriber device whereby at least part of said transmitted information can be used by the subscriber device to contact and communicate with a communication device of the person (person to be called or contacted), entity or organization associated with the input contact information from which the pre-dial operation occurred. The user can decide to use the output contact information to communicate with the corresponding person or entity by, for example, dialing a telephone number that is part of the output contact information. The user makes such a decision by reviewing the output contact information, which may assist the user to confirm and/or validate the person (or entity or organization) associated with the output contact information.

As described above, in response to receiving input contact information from a subscriber device, the DECS performs a pre-dialing operation; that is, the DECS searches various databases retrieving information thus generating one or more sets of output contact information and provides said one or more sets of DECS generated contact information to the subscriber. A pre-dialing operation is an operation performed by the DECS whereby the DECS retrieves output contact information from its database or from at least one other database with which the DECS is capable of communicating. The output contact information retrieved by the DECS is based on the input contact information received by the DECS from a subscriber device. It should be noted that a pre-dialing operation does not at all involve dialing or originating a telephone call or a starting a communication session. As a result of a pre-dialing operation, a user is given various options of output contact information and may decide to use one or more of said output contact information to perform a dial—i.e., originate a call or begin a communication session in accordance with a protocol being followed by the DECS or by the communication network with which the DECS is in communication. If after receiving the output contact information, the subscriber desires to perform a dial operation at that point, the subscriber will so indicate to the DECS server by operating the subscriber device causing such a device to transmitting a dialing request to the DECS server. In particular, the subscriber will select and indicate to the DECS server which of the one or more sets of DECS generated contact information from which he/she wishes the DECS to extract dialing information that can then be used by the DECS server (or equipment under the control of the DECS server) to perform the dialing operation. Thus, the DECS server, upon receiving a dialing request command from a subscriber device and an output contact information selection from the subscriber device, will perform a dialing operation using the selected output contact information thus originating a call for the subscriber. The DECS server, alternately, may transfer the dialing information to equipment in communication with a server of the DECS (or a communication equipment of the DECS) and control said equipment to perform the dialing operation. The equipment may be transmit, receive and processing equipment that is part of a communication system under the control (at least partially) of the DECS or a communication system in communication with the DECS.

Embodiments of the DECS, therefore, perform a reverse caller id function or operation by allowing a user desiring to make a telephone call to first perform a pre-dialing operation. The pre-dialing operation provides the user, prior to originating a telephone call, for example, DECS generated contact information (i.e., output contact information) about the party the user intends to call before the user actually makes the call.

A user device (i.e., a subscriber device) that is part of the DECS or has registered with the DECS as a subscriber has the option to, for example, make a telephone call or request that the DECS perform a pre-dialing operation from a telephone number that he/she enters into the subscriber device. In particular, a subscriber device which has been made part of the DECS and thus has established communications with the DECS will automatically provide a user the options to request for a regular dialing operation or to request for a pre-dialing operation.

Figure 1:
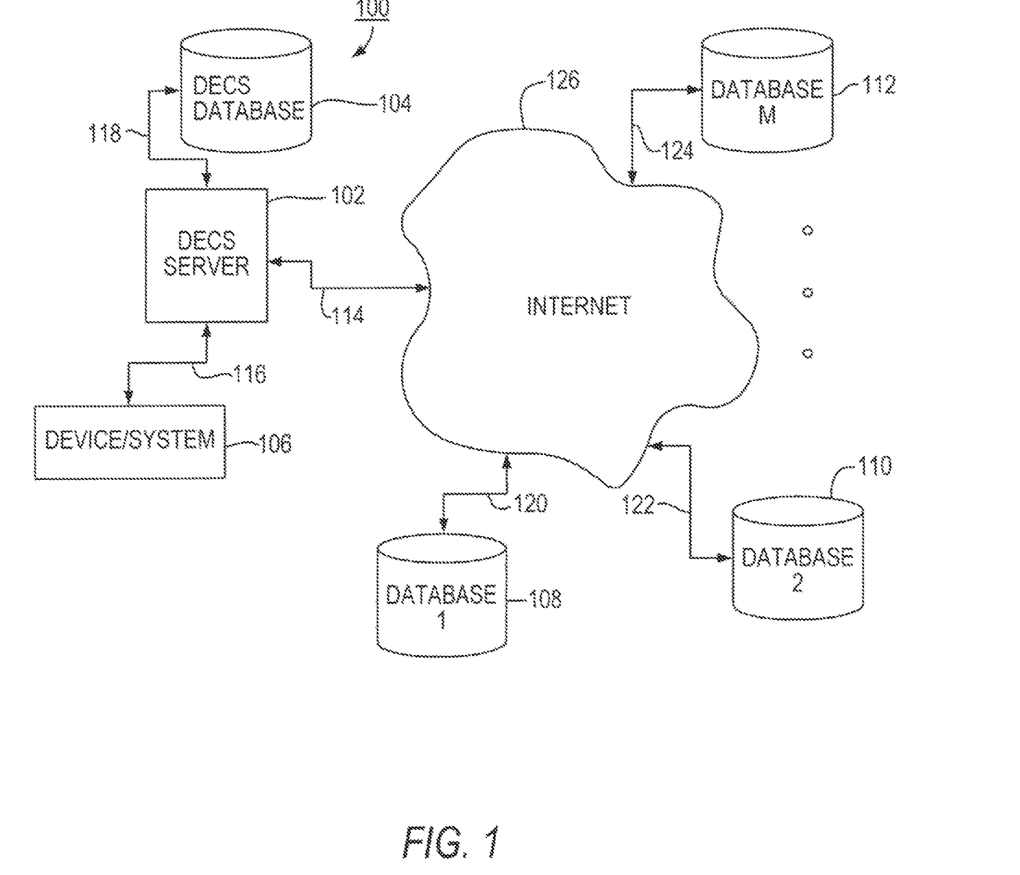
FIG. 1 is a block diagram showing one exemplary embodiment of a communication system.

Referring to FIG. 1, the device and/or system of the various embodiments to be discussed herein, DECS 102, is shown coupled to a subscriber communication device/system 106 via a communication link 116. DECS 102 is shown as being part of a communication system 100 comprising various databases (104, 112, 110 and 108) coupled to a communication network 126 (e.g., the Internet, Cloud or Web-based network, cellular network) via communication links 124, 122 and 120 respectively. As depicted in FIG. 1, in addition to its own database 104 coupled to DECS 102 via communication link 118. DECS is capable of communicating to the other databases (e.g., 108, 110, 112), which may consist of M additional databases where M is an integer equal to 1 or more. In the system embodiment shown in FIG. 1, M is equal to 3 because three other databases are shown.

DECS 102 is coupled to the Internet 126 (or a POTS, PSTN, Cloud or Web-based system) and thus to the various databases (108, 110 and 112) via communication link 114. The term "couple" refers to a direct, indirect connection and/or path that allow a signal, or information to travel from one system or device to another system or device, or from one equipment to another equipment within the same or different communication networks.

Device/System 106 can be, for example, an IP (Internet Protocol) telephone; that is, a telephone that operates in accordance with the Internet protocol. Further, device 106 can be a cellular telephone, a tablet, computer laptop, a wireline telephone for communication over POTS (Plain Old Telephone System), PSTN (Public Switched Telephone Network) or the Internet or any other communication device with dialing capabilities or capable of obtaining dialing capabilities. Further Device/System 106 can be a Web-based telephone capable of operating, via the Web or in a Cloud space in the Web—i.e., a Cloud-based phone system. Device/System 106 may also be a softphone onto which software programs are downloaded to allow such a device to operate as a telephone or other communication device. Device/System 106 is capable of performing pre-dialing operations in accordance with the protocols of the DECS. Device/System 106 is also capable of performing dialing operations in well-known manner over one or more communication networks. Device/System 106 is also referred to herein as user communication device or subscriber device. Device/System 106 can also be another system capable of communicating with DECS 102 and operate in accordance with the protocols of the DECS.

Communication device 106 comprises at least transmitter, receiver, and processing circuitry coupled to each other to operate as a device having dialing capabilities and is able to convey (i.e., transmit and receive or both) to the DECS and at least one other communication device at least voice and audio information via a communication network; device 106 operates in accordance with the protocols and complies with the communication standard(s) being followed by the DECS and the communication networks through which it conveys (i.e., transmit or receive or both) information. Communication device has memory circuits that may be part of the processing circuitry where said memory circuits are capable of receiving and storing software programs downloaded by DECS onto said communication device. Communication device 106 further has a keypad for dialing and a display for showing information being entered via the keypad and information being received from the DECS over one or more communication networks. The keypad and display are coupled to the processing circuitry. Communication device 106 thus operates in well-known fashion as a device to convey voice, audio, text, video and other types of information over one or more different types of communication networks. Communication device 106 along with the DECS operate in accordance with a communication standard and associate protocols being followed by the various communication networks through which the information is conveyed.

To initiate operation the DECS downloads the proper software onto system/device 106 (i.e., subscriber device 106) via communication link 116. Operation of an exemplary embodiment of the DECS will now be explained with reference to FIG. 2, which shows one exemplary method embodiment and also with reference to FIGS. 3, 3A, 3B and 3C showing an operation panel of an exemplary device/system 106 at various stages of operation.

Figure 2:
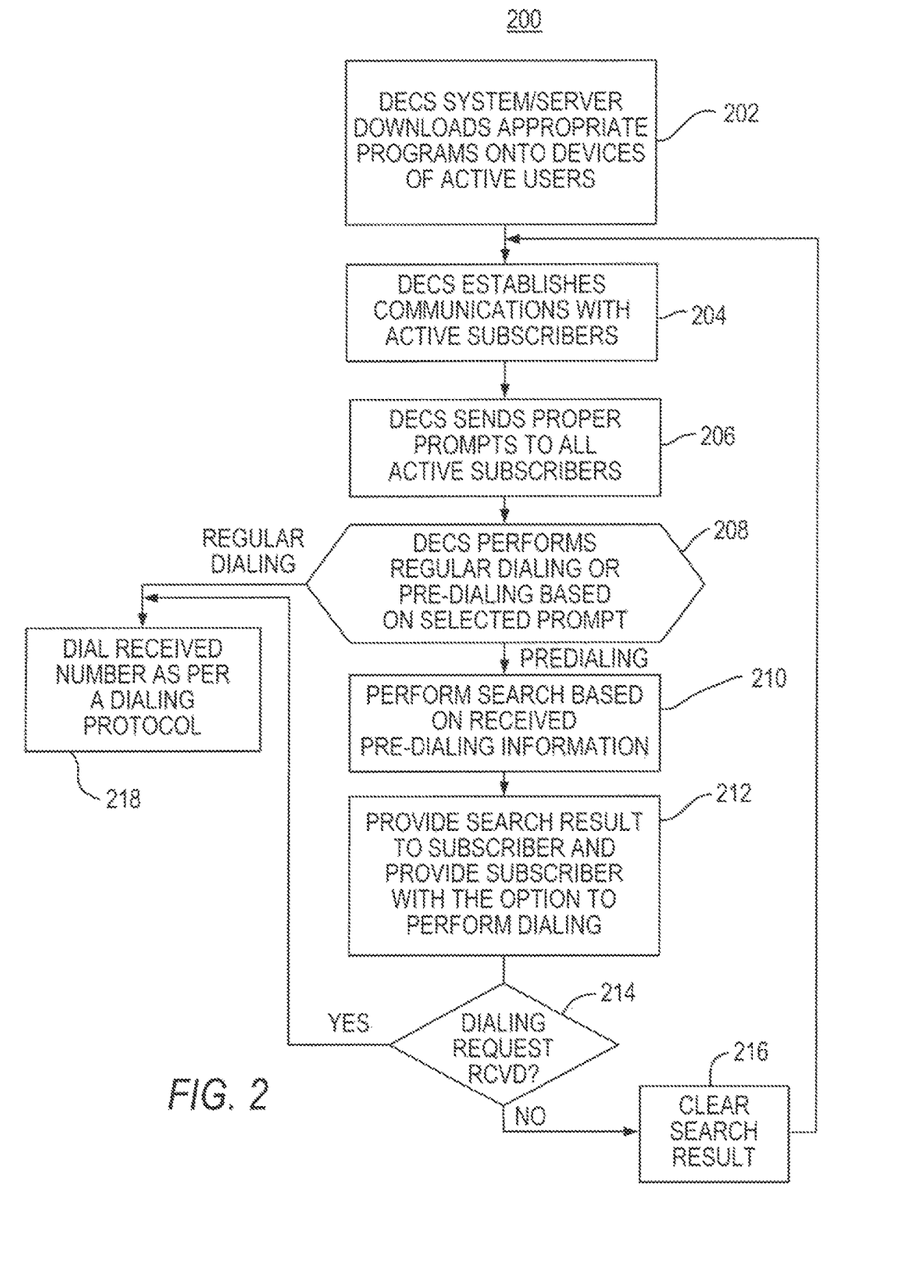
FIG. 2 is a flow chart of a method embodiment.
Figure 3:
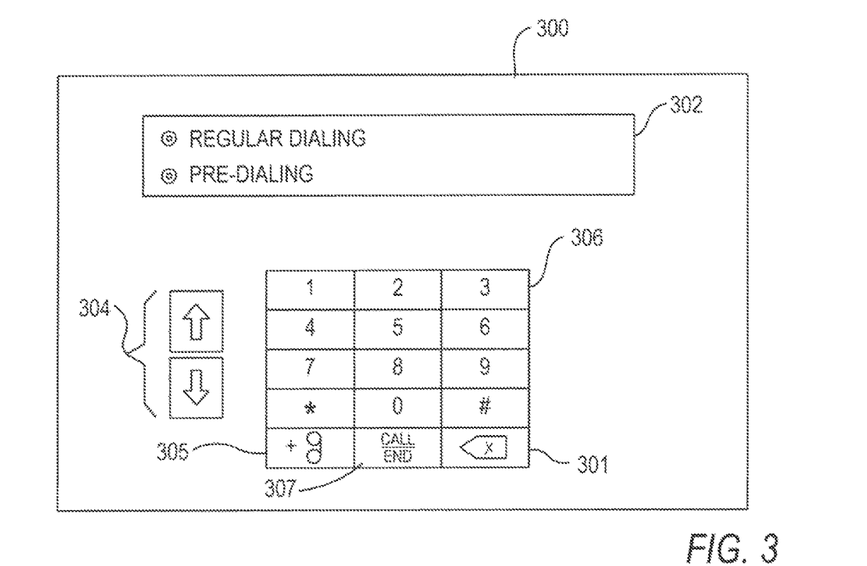
FIG. 3 shows a dial pad and display panel of one embodiment of a user communication device.
Figure 3A:
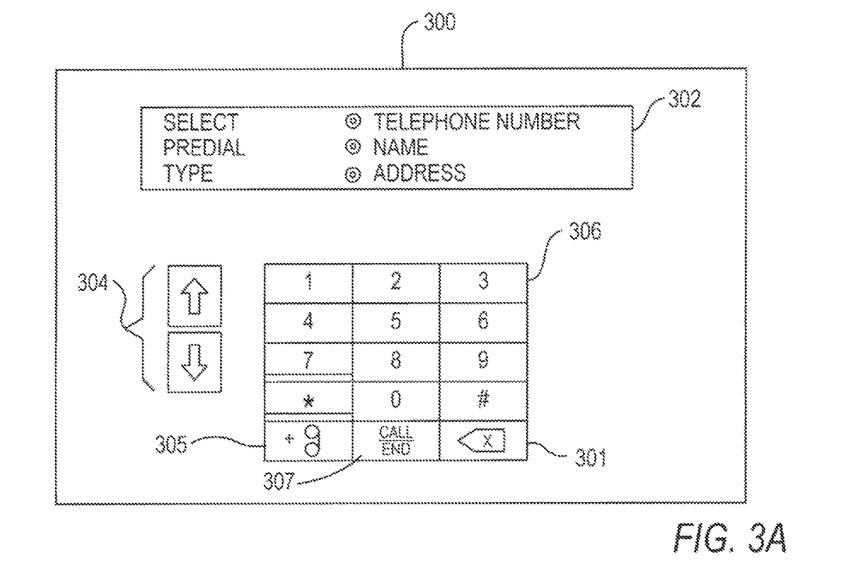
FIG. 3A shows FIG. 3 with the display showing different types of contact information.

Referring to FIG. 2, the method of an embodiment as performed by DECS server or system or device 102. In describing FIG. 2, reference to FIGS. 3, 3A, 3B and 3C will describe and explain what information a display of a user IP telephone, for example, may depict during the operation of this embodiment method. For the sake of explanation, the user is assumed to be operating an IP (Internet Protocol) telephone having an alphanumeric keypad Or dial pad. The dial pads or keypads shown in FIGS. 3-3C depict keys or buttons with numbers only. This is done for ease of illustration and explanation; it will be understood that such keypads operate as alphanumeric keypads where they can be used to enter numbers, letters and special characters (in accordance with well known conventions) as is typically done with communication devices having dialing capabilities. Thus, for example, the number of times a key is pressed consecutively will determine what letter or number is entered on the display of the device. For example, for a conventional telephone typically the key with the number 2 may also be used to enter the letters 'a,' 'b' or 'c' depending on the number of consecutive times that key is pressed by a user when entering information. Alternatively, the keyboard can be a virtual keyboard (not shown), such as a touchpad that can be either a dial pad or a QWERTY keyboard to allow numbers, letters or other symbols to be entered by an operator of the subscriber device 106.

Still referring to FIG. 2, initially DECS 102 is activated; that is, DECS 102 is powered and is ready to perform the steps of a method embodiment as described herein. Part of the activation may include, in step 202, the downloading of programs containing instructions that dictate and/or control, at least in accordance with the embodiment method, the operation of the user communication device/system 106. The downloaded program may, for example, cause device 106 to operate as an IP (Internet Protocol) telephone or a telephone that complies with certain standards and protocols enabling it to be compliant with protocols and standards of the communication network within which it is being used.

In step 204 DECS 102 establishes communications with the subscriber 106. It will be understood that DECS 102 is certainly capable of operating and providing communication services to a multiple of subscriber devices at the same time. However, in the interest of clarity of explanation, the operation of DECS 102 will be described with respect to subscriber device 106. In establishing communications with subscriber device 106, DECS 102 transmits messages to subscriber device 106 and receives responses and confirmation messages from subscriber device 106 confirming that subscriber device 106 (and other subscriber devices) is operating in accordance with a protocol of a communication standard being followed by DECS 102, and in accordance with a method embodiment as summarized in FIG. 2.

In step 206, DECS 102 continuously or periodically sends various prompts to the subscriber device 106 to show that it is operating and is available to provide communication services to subscriber devices such as device 106. As will now be explained, DECS 102 also sends prompts in response to data (entered by a subscriber, for example) received from subscriber device 106.

Referring temporarily to FIGS. 3, 3A, 3B and 3C, a display and dial pad portion 300 of subscriber device 106 is shown. Subscriber device 106 is assumed to be an IP telephone for the sake of discussion. The display and dial pad panel 300 is shown at different stages of operation as will be more particularly explained below.

Still referring temporarily to FIGS. 3-3C, each of the FIGS. 3, 3A, 3B and 3C, shows an alphanumeric keypad 306, a display screen 302 and up/down scroll keys 304 for an IP telephone, for example. Each of the keys of the dial pad 306 shows only a number, a special character, a symbol or a command. Special keys such a conference key 305, call/end key 307 and erase/correction key 301 are also shown in FIGS. 3-3C. As has already been explained above, however, other symbols and alphanumeric symbols can be typed with the keys; those symbols and/or characters are not shown for the sake of clarity of illustration of the drawings and explanation of the embodiments shown, it will be understood, therefore, that the keys of the keypad can be used to type names, addresses, telephone numbers, messages and any type of message that can be typically typed with a keyboard (e.g., a QWERTY keyboard) of an IP telephone, cellular telephone, wire line telephone or any other type of telephones or user communication devices. It should be noted that the call/end command key 307 is used to start a telephone call (i.e., DECS 102 allows a user to send a dial request command after having entered a phone number) or terminate a telephone call.

Still referring to FIGS. 3-3C, once communications between the subscriber device 106 and DECS 102 have been established, DECS 102, sends a prompt to subscriber device 106 giving a user of the subscriber device 106 the option to perform a regular dialing operation or a pre-dialing operation; see FIG. 3 where display 302 (of keypad and display panel 300) shows the two options (regular dialing or pre-dialing) provided to the user of device 106. The term "established communications" between user device 106 and DECS 102 refers to one or more protocols followed by device 106 and DECS 102 in accordance with a communication standard being followed by device 106 and DECS 102 to dictate to them how to communicate with each other. A user can use the scroll keys 304 to select one of the two options presented in FIG. 3. The user can then press the call/end key 307 to transmit the selected option to DECS 102.

Referring back to FIG. 2, in step 208, the subscriber decides whether to perform a dialing operation or a pre-dialing operation. If a dialing operation is selected, then the method of this embodiment moves to step 218. To perform a dialing operation, a subscriber enters the number to be dialed (for example, via keypad 306 of FIG. 3) and presses the call/end key 307 causing subscriber device 106 to send a dial request to DECS 102. The dialing is performed by equipment that is part of the communication network of which DECS 102 is a part. DECS 102 can be configured to be in communication with such equipment. Alternatively, the owner/operator of DECS 102 may own equipment that can perform dialing operations in accordance with one or more dialing protocols.

Still referring to FIG. 2, suppose, in step 208, the user of device 106 uses up/down scroll keys 304 to select a pre-dialing operation (instead of a regular dialing operation—see FIG. 3) and then presses the call/end key, 307 of keypad 306 to transmit its selection as a command to DECS 102. Because the DECS 102 has received the pre-dialing request command from the subscriber device, the method of this embodiment moves to step 210 where DECS 102 performs a pre-dialing operation. In particular, DECS 102 first transmits search input options to subscriber device 106. An example of the type of search input options that may be transmitted by DECS 102 is shown in FIG. 3A whereby display 302 depicts three types of search input options that the DECS 102 can use to retrieve or generate (or both) output contact information. In the example shown, display 302 of FIG. 3A provides a subscriber the opportunity to indicate to the DECS 102 which type of search input option that will be received by the DECS. The user operates the user device to indicate to the DECS which search input option has been selected. After receiving the selected option, the DECS prompts the subscriber device to enter the actual information to be used for the pre-dialing. The actual information corresponding to the selected search input option is provided by the user by causing the subscriber device 106 to transmit such information to the DECS—this information is known as input contact information. The input contact information is thus transmitted by the subscriber device to the DECS upon the subscriber device receiving a prompt from the DECS to transmit such information. In the example shown, in FIG. 3A, display 302 depicts three search input options: a 'telephone number,' 'a name,' and an 'address.'

It should be well understood, however, that there could be more than three types of search input options DECS 102 generates as part of a list of possible types of search input option. For example, an e-mail address can also be used as one search input option. Suppose for the sake of discussion that the user uses up/down scroll keys 304 to select "telephone number" as the type of search input option to be used by DECS 102 for the pre-dialing operation (see FIG. 3A) and presses call/end key 307 to transmit that selection. In response to the type of search input option received by DECS 102, it sends a prompt to the subscriber device 106 to indicate to the user to enter the telephone number. In general, DECS transmits a prompt to subscriber device 106 to indicate to the user to enter information (i.e., input contact information) corresponding to the type of search input option selected on the device (by the user) and transmitted by device 106.

Figure 3B:
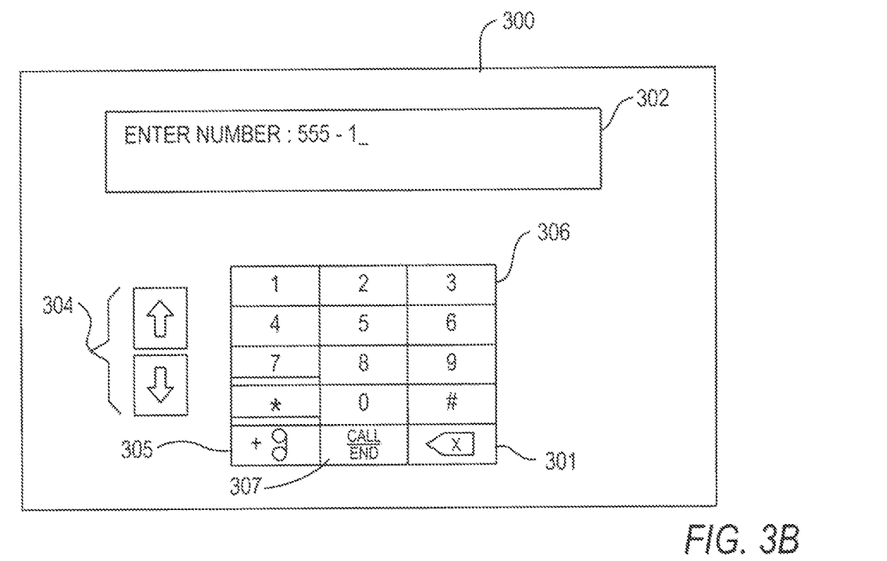
FIG. 3B shows FIG. 3 during a key entry process of a type of contact information.
Figure 3C:
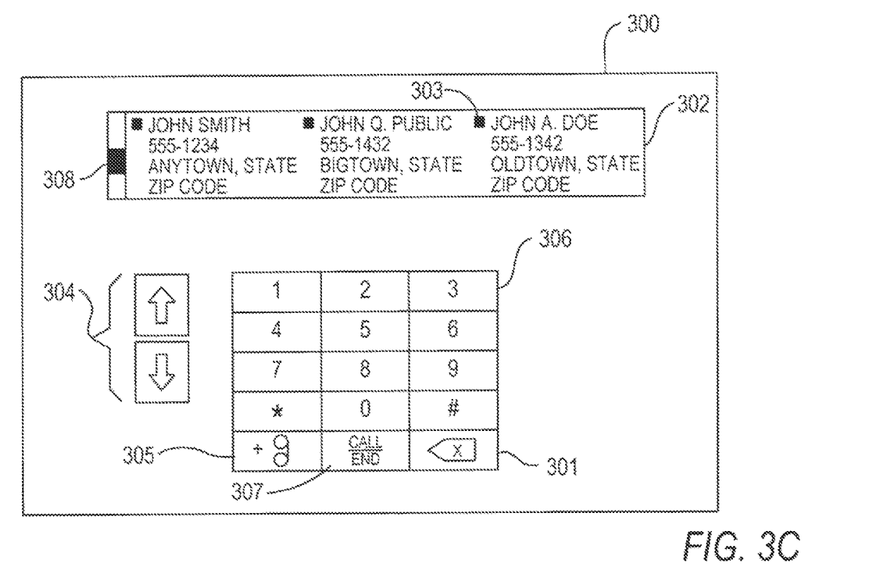
FIG. 3C shows an exemplary set of contact information generated by the system embodiment and which is being displayed by the user communication device.

FIG. 3B shows how display 302 provides the means for the user to enter the telephone number. A similar prompt such as "ENTER ADDRESS" would have been sent by DECS if the user had selected an 'address' as the search input option. FIG. 3B shows the point at which four numbers as having already been entered by a user of device 106.

The steps 210 and 212 are explained in detail with reference to FIGS. 3B and 3C. A more detailed description of steps 210 and 212 now follows.

FIG. 3B shows the telephone number as it is being entered. This is shown to explain that DECS 102, in step 210, searches its database 104 and the other databases (108, 110 and 112) after each key entry in performing a look-ahead search for information associated with the telephone number being entered. FIG. 3C shows the result of the search after the fourth number (i.e., number "1") has been entered. At any point during entry of the telephone number, the user may press the asterisk key to see the result thus far. To continue entering the telephone number, the user simply presses the asterisk key again. In the look-ahead search after the first number (or letter, if the contact type is a name instead of a telephone number), the search result is generated and saved. It should be noted that DECS 102 is certainly not limited to performing only a look-ahead search; DECS 102 may perform any type of search algorithm at any of the databases that it searches. Further, DECS 102 may perform different algorithms at different databases for the same search. After the second number is entered, the saved search result is searched and the result from this second search is now saved. This iterative process continues until the last number of the telephone number is entered and the search result is retrieved.

In step 212, DECS 102 transmits the result of the search (i.e., the output contact information), which is displayed on display 302 allowing the user to select one of the sets of output contact information and providing the user the option to perform a dialing operation using telephone number from the DECS generated output contact information selected by the user. FIG. 3C shows a result of a look-ahead search performed by DECS 102 after the fourth number was entered. The subscriber entered the '*' key to get the result thus far (see FIG. 3C) and then enters the asterisk key again to return to completing the dialing of a phone number obtained from the output contact information. At that point, the search by DECS 102 has generated three sets of output contact information that could possibly match all of the numbers in the telephone number being entered by the user of the subscriber device 106. It should be noted that display 302 shows a scroll 308 which can be operated by the user with up/down scroll keys 304 to view the results of the search done by DECS 102 (i.e., DECS generated output contact information) as the input contact information (i.e., a telephone number, in this case) is being entered by a subscriber. Thus, as can be seen in the above discussion, the operation of pre-dialing as performed by DECS 102 involves DECS 102 receiving a prompt indicating which search input option is to be used for a search. One or more databases are then searched to generate one or more sets of output contact information (i.e., DECS generated contact information) associated with the received input contact information.

Continuing with our example, after the seventh number has been entered, the result of the search may be that (i) the number cannot be found or more specifically, there is no matching set of contact information for the telephone number entered; (ii) only one set of contact information is found or (iii) more than one set of information is found. For cases (i) and (ii), DECS 102 will send a message to the subscriber device 106 asking the subscriber whether he/she wants to proceed to dial the found number (one number found) or the number entered by subscriber (no information found). For case DECS 102 will send a message to the subscriber device 106 to select one of the sets of output contact information to indicate his/her desire to dial the number from that set of contact information. Also, the subscriber will have the option to not proceed to a dialing operation and terminate the session with DECS 102 (by pressing the call/end key 307). Alternately, the user may decide to not use any of the output contact information provided and dial another number; this would entail the user pressing the call end key 307 to return to steps 204-208 at which point, the user would select the option of regular dialing as prompted by the device (shown in FIG. 3).

Further, the user may decide to proceed with the dialing operation and thus would first indicate which set of DECS generated contact information he/she has selected (using scroll keys 304) and cause the user device to transmit such a request to DECS 102 by pressing the call/end key 307. Note the pound (or hash tag) key can be also used to scroll horizontally to the right to select from one of the columns of contact information shown. Thus, for example, if the user wants to select information associated with John A. Doe (as shown by display 302 of FIG. 3C), the user will scroll down (using scroll keys 304) causing scroll 308 to scroll downwards and then press the 'pound' or 'hash tag' key to move to the right to highlight the desired bullet point 303, which for the example shown in FIG. 3C will highlight the bullet point for 'John A. Doe.'

In step 214, the user can then press and hold (for about 2 seconds) the call/end key to indicate to the DECS 102 that a dialing operation is requested based on the selected DECS generated output contact information. Upon reception of such a dialing request from subscriber device 106, this embodiment moves to step 218 where a telephone number extracted from the selected DECS generated contact information is dialed by the DECS 102.

In step 218, a dialing operation is performed in accordance with a dialing procedure and/or protocol being followed by DECS 102 and/or the communication network of which DECS 102 is a part. DECS 102 may have the proper equipment to originate a call and thus perform the dialing information as described or it may relay the telephone number and dialing request to other equipment with which it is in communication where such other equipment may be owned and/or controlled by the same entity that owns and/or controls DECS 102.

Returning to step 214, for the case where the user does not wish to perform a dialing operation after receiving the output contact information, the user can press the call/end key twice in quick successions to cause the subscriber device 106 to transmit a no-dialing command. This embodiment then moves to step 216 where the search result being shown on display 302 is cleared from the display by the DECS 102. For example, DECS 102 can transmit a signal to subscriber device 106 that commands the device to clear the display. This embodiment then moves to step 204 where it waits for a prompt from any one of the subscribers.

Returning to step 208, if the DECS receives a request for regular dialing, this method embodiment moves to step 218 to perform a dialing information (as described above) of the number received by DECS 102 (i.e., the number entered into the subscriber device 106).

While various aspects of exemplary embodiments have been described above, it should be understood that they have been presented by way of example and not limitation. It will be apparent to persons skilled in the relevant art(s) that various changes in form and detail can be made therein without departing from the spirit and scope of embodiments falling within the scope of the claims. Thus, the discussed embodiments should not be understood to limit the recited claims and their equivalents.

In addition, it should be understood that the figures in the attachments, which highlight the structure, methodology, functionality and advantages of the discussed embodiments, are presented for example purposes only. The discussed embodiments are only examples of the various manners in which the method and device recited in the claims and shown in accompanying figures may be implemented.

What is claimed is:

1. A method comprising:
   transmitting, by a DECS (Data Entry Confirmation System), a message providing a dialing option and a pre-dialing option to a registered communication device after having established communications with the registered communication device; and
   performing, by the DECS of a communication network, a pre-dialing operation for the registered communication device wherein said pre-dialing operation comprises:
   the DECS transmitting N search input option types to the registered communication device where N is an integer equal to 1 or greater;
   the DECS receiving a selected search input option type from the registered communication device;
   the DECS receiving input contact information from the registered communication device, said input contact information corresponding to the selected input option type;

the DECS transmitting output contact information in response to receiving at least a portion of an input contact information;

wherein prior to performing the pre-dialing operation, the DECS downloads operating software onto the registered communication device in accordance with a communication standard being followed by the DECS and the registered communication device.

2. The method of claim 1 further comprising the step of performing, by the DECS, a dialing operation upon the DECS receiving a dialing request command from the registered communication device, where the DECS uses an output contact information selection from the registered communication device to perform said dialing operation.

3. The method of claim 1 wherein the input contact information is one of a name, an address, a telephone number, and e-mail address.

4. The method of claim 1 wherein the step of the DECS transmitting output contact information comprises the DECS performing a search in at least one database communicable with the DECS to retrieve the output contact information.

5. The method of claim 4 wherein the search performed by the DECS is a look ahead search.

6. The method of claim 1 wherein the DECS retrieves the output contact information from its own database.

7. The method of claim 2 wherein the DECS performs the pre-dialing operation upon receiving a pre-dialing request command and the DECS extracts information from the selected output contact information to perform the dialing operation.

8. The method of claim 1 wherein the DECS performs a dialing operation without using any information from the output contact information.

9. The method of claim 1 wherein the DECS is part of a communication system comprising transmitting, receiving and processing equipment in communication with the DECS and said DECS is communicable with M databases over the communication network, where M is an integer equal to 1 or greater.

10. The method of claim 9 wherein the communication network is the Internet.

\* \* \* \* \*